United States Patent
Lee et al.

(10) Patent No.: US 6,582,584 B2
(45) Date of Patent: Jun. 24, 2003

(54) METHOD FOR ENHANCING HEAT TRANSFER INSIDE A TURBULATED COOLING PASSAGE

(75) Inventors: Ching-Pang Lee, Cincinnati, OH (US); Rong-Shi Paul Chiu, Glenmont, NY (US)

(73) Assignee: General Electric Company, Schenectady, NY (US)

( * ) Notice: Subject to any disclaimer, the term of this patent is extended or adjusted under 35 U.S.C. 154(b) by 51 days.

(21) Appl. No.: 09/925,024

(22) Filed: Aug. 9, 2001

(65) Prior Publication Data

US 2002/0025248 A1 Feb. 28, 2002

Related U.S. Application Data

(60) Provisional application No. 60/149,616, filed on Aug. 16, 1999, provisional application No. 60/149,618, filed on Aug. 16, 1999, provisional application No. 60/149,617, filed on Aug. 16, 1999, and provisional application No. 60/149,619, filed on Aug. 16, 1999.

(51) Int. Cl.[7] ................................................. B23H 3/00
(52) U.S. Cl. ..................... 205/660; 205/640; 205/666; 416/97 R
(58) Field of Search ................................ 205/640, 660, 205/666; 416/97 R

(56) References Cited

U.S. PATENT DOCUMENTS

| | | | |
|---|---|---|---|
| 5,413,463 A | 5/1995 | Chiu et al. | 416/95 |
| 5,536,143 A | 7/1996 | Jacala et al. | 416/96 R |
| 5,738,493 A | 4/1998 | Lee et al. | 416/97 R |
| 5,797,726 A | 8/1998 | Lee | 416/96 R |
| 6,142,734 A | 11/2000 | Lee | 416/97 R |
| 6,174,134 B1 | 1/2001 | Lee et al. | 416/97 R |
| 6,200,439 B1 * | 3/2001 | Wei et al. | 204/284 |
| 6,234,755 B1 | 5/2001 | Bunker et al. | 416/97 R |
| 6,243,948 B1 | 6/2001 | Lee et al. | 29/889.1 |
| 6,273,682 B1 | 8/2001 | Lee | 416/97 R |
| 6,290,463 B1 | 9/2001 | Fargher et al. | 416/97 R |
| 6,416,283 B1 * | 7/2002 | Johnson et al. | 416/97 R |

* cited by examiner

*Primary Examiner*—Nam Nguyen
*Assistant Examiner*—Brian L Mutschler
(74) *Attorney, Agent, or Firm*—Nixon & Vanderhye P.C.

(57) ABSTRACT

A method of enhancing heat transfer and cooling efficiency in a cooling passage includes forming a plurality of turbulator rings in the passage, the rings projecting inwardly, substantially perpendicular to a cooling flow direction in the passage; and using a patterned electrode, forming at least one gap in one or more of the turbulator rings, extending substantially parallel to the flow direction.

16 Claims, 1 Drawing Sheet

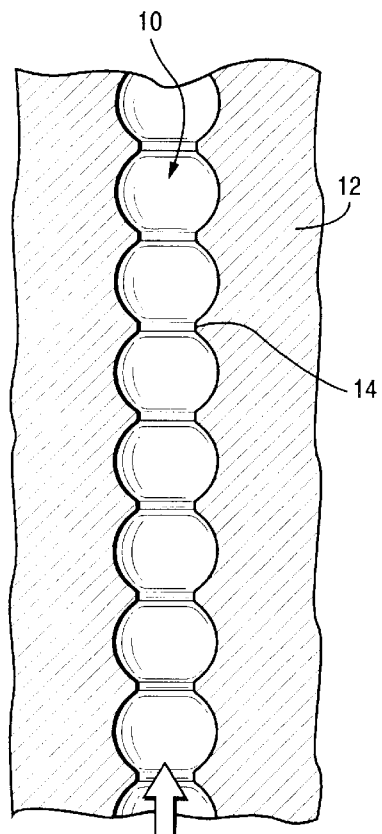
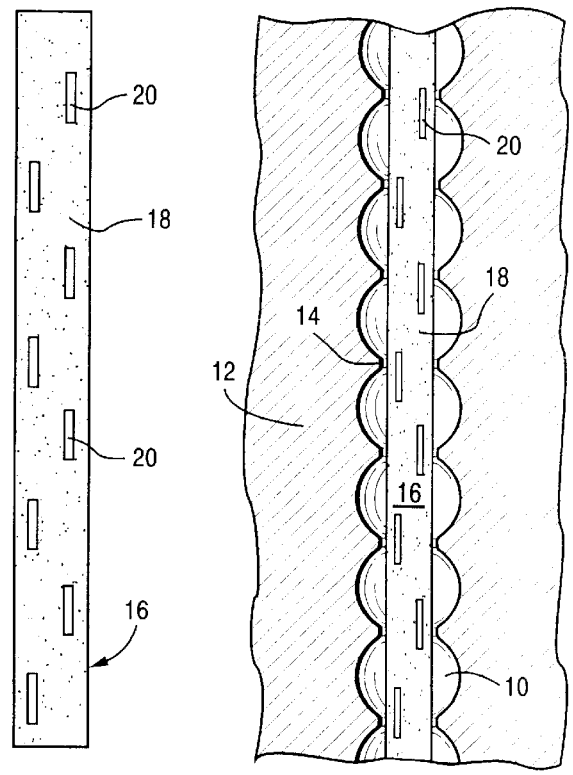
Fig. 1 (Prior Art)    Fig. 2    Fig. 3
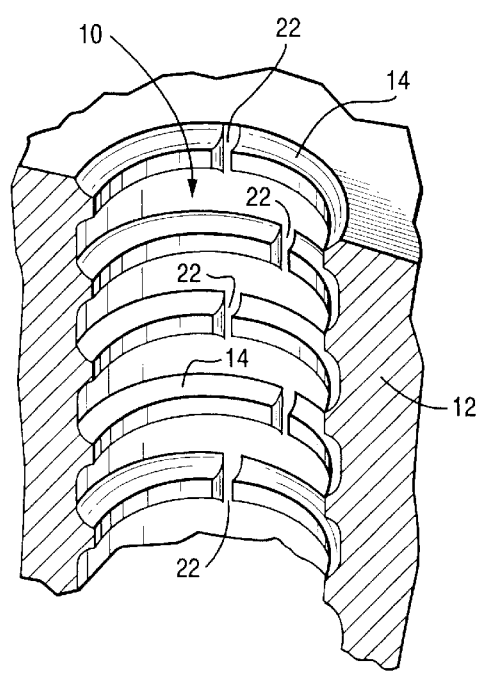
Fig. 4

METHOD FOR ENHANCING HEAT TRANSFER INSIDE A TURBULATED COOLING PASSAGE

This application is related to commonly assigned applications Ser. Nos. 60/149,616, filed Aug. 16, 1999 titled "A Method and Tool for Electrochemical Machining;" 60/149,618, filed Aug. 16, 1999 titled "A Method and Tool for Electrochemical Machining;" 60/149,617, filed Aug. 16, 1999 titled "A Method and Tool for Electrochemical Machining;" 09/187,663, titled "A Method and Tool for Electrochemical Machining" and now U.S. Pat. No. 6,200,439; 09/187,664, titled "Process for Fabricating a Tool Used in Electromechanical Machining" and now U.S. Pat. No. 6,303,193; filed Aug. 16, 1999 and 60/149,619, titled "A Method and Tool for Electrochemical Machining;" and 09/688,579, titled "Electromechanical Machining Process, Electrode Therefor and Turbine Bucket With Turbulated Cooling Passages," now U.S. Pat. No. 6,416,283, all of which are incorporated herein by reference.

BACKGROUND OF THE INVENTION

This invention relates to cooling passages in turbine components such as nozzles or buckets and, specifically, to turbulated cooling passages that enhance heat transfer and thus cooling efficiency.

Gas turbine efficiencies are directly proportional to the temperature of turbine gases flowing along the hot gas path and driving the turbine blades. Gas turbines typically have operating temperatures on the order of 2700° F. To withstand these high temperatures, the buckets are manufactured from advanced materials and typically include smooth bore cooling passages for flowing a cooling medium, typically compressor discharge air, through the buckets. The passages also typically extend from the radially inner bucket root to the radially outer bucket tip. While smooth-bore passages have been utilized, turbulence promoters, e.g., turbulators, are also used in many gas turbine buckets to enhance the internal heat transfer coefficient. The heat transfer enhancement can be as high as 2.5 times as compared with smooth-bore passages for the same cooling flow rate. Turbulators conventionally comprise internal ridges or roughened surfaces along the interior surfaces of the cooling passages and are typically cast inside the cooling passages using ceramic cores. In many currently used turbines, however, many of the buckets have interior cooling passages with smooth interior wall surfaces formed by the casting process and therefore do not obtain the enhanced cooling effects otherwise available with turbulators. Many power generation turbine buckets use Shaped Tube Electrochemical Machining (STEM) drilled circular round holes to form the radial cooling flow passages inside the turbine airfoils. (STEM) is used for non-contact drilling of small, deep holes in electrically conductive materials, with high aspect ratios such as 300:1. The aspect ratio is the ratio of the length or depth of the hole to the largest lateral dimension, e.g., diameter, of the hole which, in certain specific applications, can be a small as a few millimeters. The STEM process removes stock by electrolytic dissolution, utilizing flow of electric current between an electrode and the workpiece through an electrolyte flowing in the intervening space.

Ridges, or annular turbulator rings, inside the cooling passages can be formed during the STEM drilling process as described in the '579 application. These circular turbulator rings project into the passage, perpendicular to the cooling flow direction, to generate turbulence vortices for heat transfer enhancement inside the cooling passage. Typically, after a period of field service, the surfaces between rings will accumulate dirt from the cooling air and form an undesirable insulation layer and hence reduce the cooling efficiency. It is desirable to have improved features that can further enhance the heat transfer and also reduce the dirt accumulation inside the STEM drilled turbulated cooling passage, and thus maintain cooling efficiency.

BRIEF SUMMARY OF THE INVENTION

In the process of this invention, already formed turbulator rings are modified to include axially oriented gaps that provide additional air paths and prevent stagnation flow regions between the rings.

To form the gaps using the STEM process, an electrode with a cross-section slightly smaller than the existing radial cooling passage is selected. The electrode has an insulating dielectric material or coating on the entire exterior surface. Part of the coating is subsequently removed using, for example, a laser ablation technique to form a desired gap pattern. The axial spacing between gaps is equal to the spacing between the turbulator rings in the cooling passage. Circumferentially, at least two gaps are provided for each ring. The gaps can be either aligned or offset between adjacent rings. The patterned electrode is then located inside the existing cooling passage, using the STEM process to create multiple axially oriented gaps in the turbulation rings. Specifically, the patterned electrode, in conjunction with an electrolyte and the application of an electrical current between the electrode and the workpiece (bucket) dissolves metal from the adjacent parts of the turbulator rings to form the axial gaps in the rings. As already noted, these gaps provide additional air paths such that, when air passes through the edges of the gaps, additional turbulence vortices will be generated to enhance surface heat transfer and thus cooling efficiency while also reducing debris accumulation.

Accordingly, in its broader aspects, the invention relates to a method of enhancing heat transfer and cooling efficiency in a cooling passage comprising forming a plurality of turbulator rings in the passage, the rings projecting inwardly, substantially perpendicular to a cooling flow direction in the passage; and using a patterned electrode, forming at least one gap in one or more of the turbulator rings, at least one gap extending parallel to the flow direction.

In another aspect, the invention relates to a process for forming gaps in radially inwardly projecting turbulator rings inside a cooling passage in a workpiece, comprising the steps of: (a) locating within the passage an electrode having electrical insulating material thereon, interrupted by non-insulated portions, thus creating a pattern of non-insulated portions of the electrode about an outer surface of the electrode in general opposition to intended locations of the gaps in the turbulator rings; (b) flowing an electrolyte through the cooling passage, between the electrode and an interior surface of the cooling passage; and passing an electric current between the electrode and the workpiece to form the gaps in the turbulator rings.

BRIEF DESCRIPTION OF THE DRAWINGS

FIG. 1 is a cross-section through a prior turbulated cooling passage;

FIG. 2 is a schematic side elevation of a patterned electrode in accordance with the invention;

FIG. 3 is a cross section similar to FIG. 1 but with the electrode of FIG. 2 inserted therein; and FIG. 4 is a partial perspective of a turbulated cooling passage with heat transfer enhancement gaps in accordance with the invention.

DETAILED DESCRIPTION OF THE INVENTION

With reference to FIG. 1, a cooling passage 10 in a machine component 12 (for example, a high pressure turbine nozzle or bucket) is typically formed as a smooth bore when the bucket (or other component) is cast. Thereafter, the passage is re-formed to include a plurality of annular ridges or turbulator rings 14 in axially spaced relationship along substantially the entire length of the passage. The turbulator rings 14 can be formed during a STEM drilling process by a patterned electrode that results in annular grooves being formed in the passage, leaving turbulator rings therebetween. In other words, the original passage diameter is substantially the same as the inner diameter of the turbulator rings. In the '579 application, the turbulator rings and gaps are formed in a single step. The present invention utilizes STEM drilling to provide an enhancement that can be "retrofit" to existing turbulated passages that do not have gaps in the rings.

FIG. 2 illustrates an electrode 16 designed to form axially oriented, circumferentially arranged gaps in the previously formed turbulator rings 14. Specifically, the electrode 16 is a hollow, cylindrical tube with an outside diameter slightly smaller than the diameter of the passage 10, and particularly, smaller than the inside diameter of the turbulator rings 14. In the exemplary embodiment, the inside diameter of the electrode is about 0.005 in. smaller than the inside diameter of the turbulator rings 14. The electrode 16 is provided with a dielectric, or electrically insulating coating 18 over substantially its entire length. Portions of the coating 18 are selectively removed by, for example, a laser ablation method, to create a desired gap pattern as shown in FIG. 2. The shape, size and axial spacing of the now exposed (i.e., uninsulated) portions 20 of the electrode correspond to the desired gaps 22 in the turbulator rings 14. Specifically, the non-insulated gap portions cooperate with electrolyte passed between the electrode 16 and the turbulator rings and the application of current between the electrode and the bucket to remove metal material from the turbulator rings 14, directly adjacent the exposed portions 20 on the electrode, thus forming the gaps 22 (see FIG. 4). Circumferentially, it is preferred to have at least one and preferably two gaps 22 per turbulator ring 14, and the gaps 22 may be aligned or offset as between adjacent turbulators.

Gaps 22 provide additional air paths and prevent the formation of stagnation flow regions between the turbulators. When air passes through the gaps 22, additional turbulence vortices will be generated to enhance surface heat transfer. The gaps 22 will also reduce dirt accumulation between the turbulator rings to thereby maintain cooling efficiency.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of enhancing heat transfer and cooling efficiency in a cooling passage comprising:
   forming a plurality of turbulator rings in said passage, said turbulator rings projecting inwardly, substantially perpendicular to a cooling flow direction in the passage; and thereafter, in a separate step, using a patterned electrode, forming at least one gap in one or more of said turbulator rings, said at least one gap extending parallel to said flow direction.

2. The method of claim 1 wherein said at least one gap comprises two or more gaps.

3. The method of claim 1 wherein at least one gap is formed in each of said turbulator rings.

4. The method of claim 3 wherein at least two gaps are formed in each of said turbulator rings.

5. The method of claim 4 wherein gaps in said turbulator rings are circumferentially aligned with gaps in adjacent turbulator rings.

6. The method of claim 4 wherein gaps in adjacent turbulator rings are circumferentially offset.

7. A method of enhancing heat transfer and cooling efficiency in a cooling passage comprising:
   forming a plurality of turbulator rings in said passage, said turbulator rings projecting inwardly, substantially perpendicular to a cooling flow direction in the passage; and
   using a patterned electrode, forming at least one gap in one or more of said turbulator rings, said at least one gap extending parallel to said flow direction;
   wherein said turbulator rings and said at least one gap are formed by electrochemical machining; and
   wherein said at least one gap is formed by an electrode coated with insulation over its entire exterior surface with the exception of exposed portions corresponding to said at least one gap.

8. A method for forming gaps in radially inwardly projecting turbulator rings inside a cooling passage in a workpiece, comprising the steps of:
   (a) locating within the passage an electrode having electrical insulating material thereon, interrupted by non-insulated portions, thus creating a pattern of non-insulated portions of the electrode about an outer surface of the electrode in general opposition to intended locations of the gaps in said turbulator rings;
   (b) flowing an electrolyte through said cooling passage, between said electrode and an interior surface of said cooling passage; and
   (c) passing an electric current between said electrode and said workpiece to form said gaps in the turbulator rings.

9. The method of claim 8 wherein said gaps comprise two or more gaps.

10. The method of claim 8 wherein at least one gap is formed in each of said turbulator rings.

11. The method of claim 10 wherein at least two gaps are formed in each of said turbulator rings.

12. The method of claim 8 wherein said turbulator rings and said gaps are formed by electrochemical machining.

13. The method of claim 11 wherein gaps in adjacent turbulator rings are circumferentially aligned with gaps in adjacent turbulator rings.

14. The method of claim 11 wherein gaps in adjacent turbulator rings are circumferentially offset.

15. The method of claim 8 wherein said cooling passage is located in a gas turbine nozzle component.

16. The method of claim 8 wherein said cooling passage is located in a gas turbine bucket component.

* * * * *